Oct. 31, 1933. A. N. REBORI 1,932,477
SUN FLASH BEACON
Filed Oct. 8, 1930 3 Sheets-Sheet 2
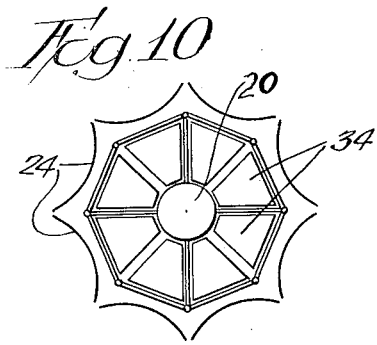
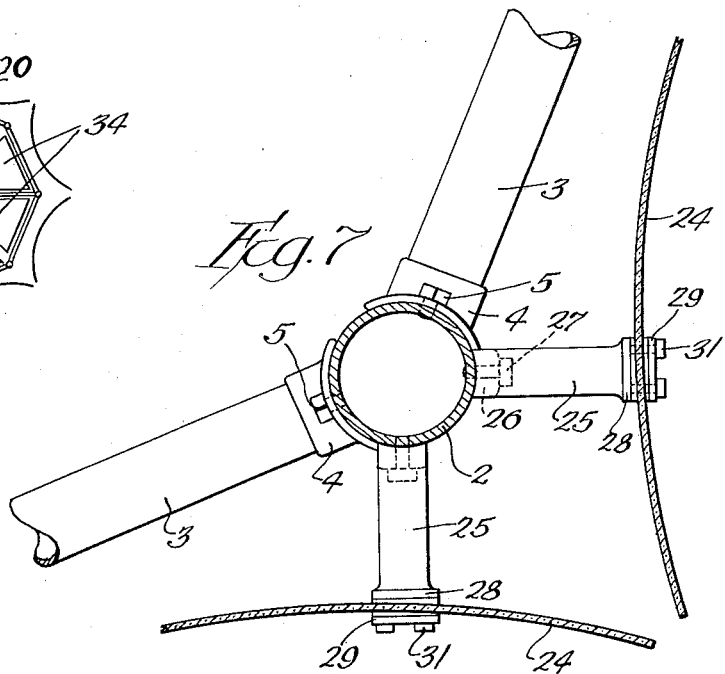
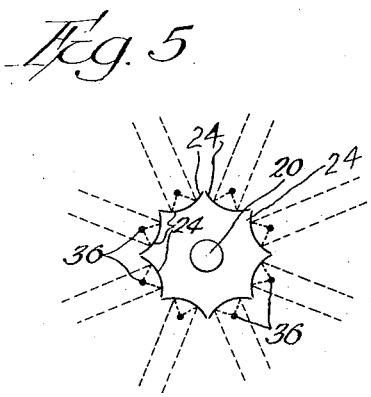
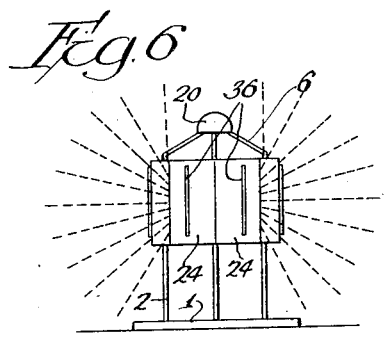
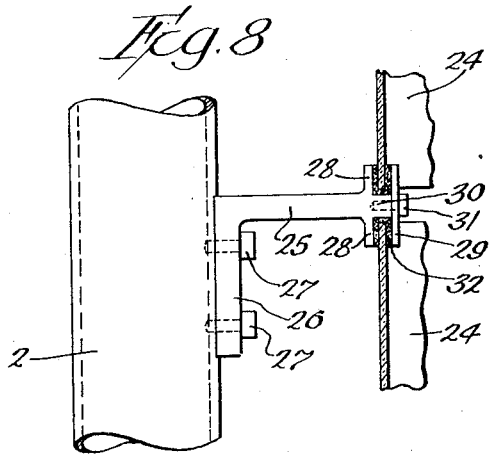

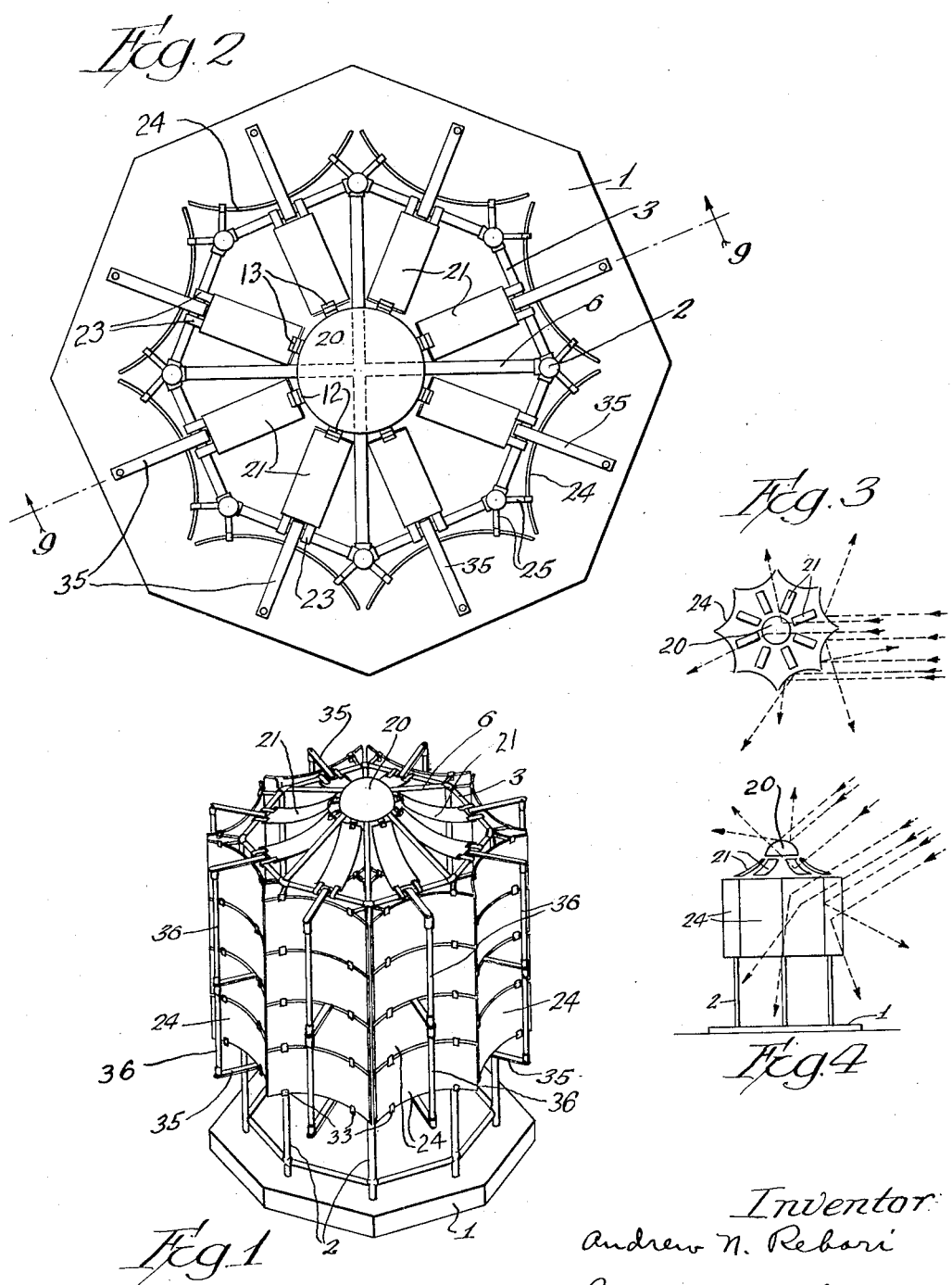

Oct. 31, 1933.   A. N. REBORI   1,932,477
SUN FLASH BEACON
Filed Oct. 8, 1930   3 Sheets-Sheet 3

Inventor:
Andrew N. Rebori,
By Chas. M. Nissen,
Atty.

Patented Oct. 31, 1933

1,932,477

UNITED STATES PATENT OFFICE 1,932,477

SUN FLASH BEACON

Andrew N. Rebori, Chicago, Ill.

Application October 8, 1930. Serial No. 487,103

1 Claim. (Cl. 88—1)

The present invention relates to aerial beacons for sending out rays of light either during the day or at night for the guidance of aviators.

One object of this invention is to provide a device which utilizes the rays of the sun for flashing a beacon of light to aviators to guide them in their approach to a predetermined place.

Another object of this invention is to equip the device with illuminating means which have the rays emitted thereby, reflected by the same or different reflectors which are used for reflecting the rays of light which come from the sun. More specifically my invention contemplates the use of vacuum tubes, preferably filled with neon gas such as is used in what is termed the ordinary neon tube.

The reflectors intensify the light rays which are emitted by the vacuum tubes so that a beam is projected by the reflectors which is visible for many miles, and due to the fact that the neon tube is visible for a great distance without having the light therefrom intensified, it will readily be seen that by increasing the intensity thereof perhaps thirty or forty times the original intensity, the visibility of the neon light will be greatly increased.

Referring now to the drawings—

Fig. 1 is an isometric view of a device embodying my invention;

Fig. 2 is a plan view thereof;

Fig. 3 is a diagrammatic plan view showing the manner in which the light rays from the sun are reflected by the flash beacon;

Fig. 4 is a diagrammatic elevational view showing in elevation the manner in which the light rays from the sun are reflected;

Fig. 5 illustrates in a diagrammatic manner in which the light from the neon tubes is reflected at night;

Fig. 6 is an elevational view showing the manner in which the rays of light from the neon tubes are reflected;

Fig. 7 is a detail fragmentary view illustrating the manner in which part of the frame work is assembled and the manner in which the reflectors are supported;

Fig. 8 illustrates more clearly the manner in which a single bracket supports two adjacent mirrors.

Fig. 10 shows an alternative arrangement of the reflectors; and

Figure 9:
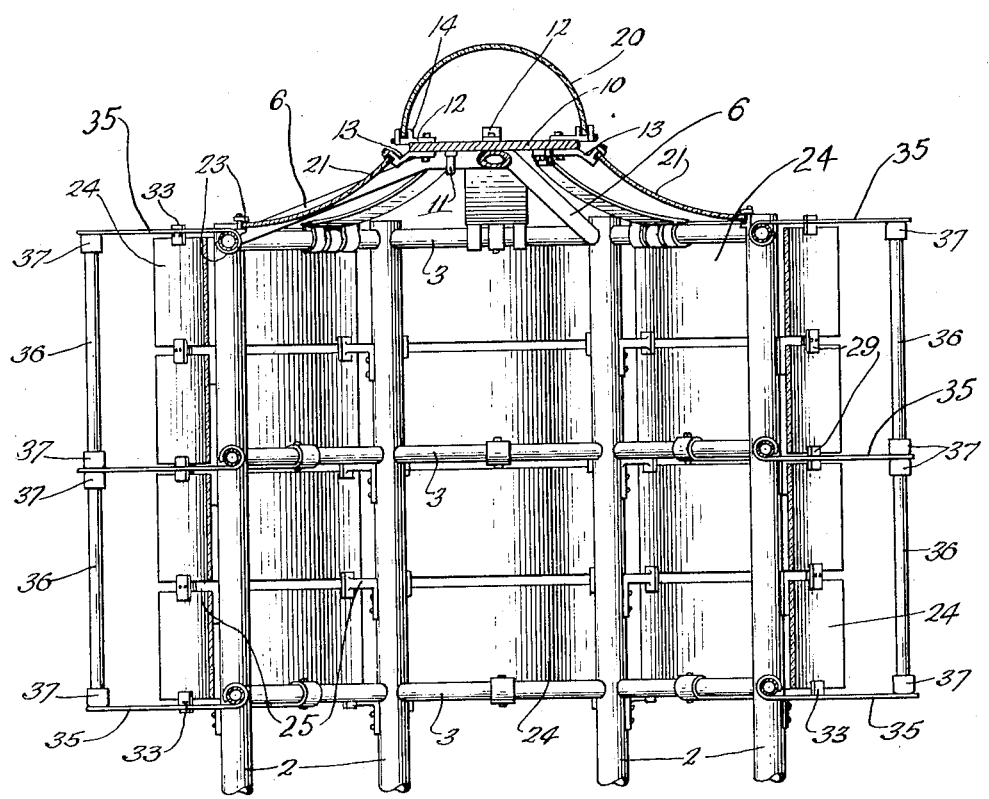
Fig. 9 is a cross-section taken on the line 9—9 of Fig. 2.

Referring now more particularly to Figs. 1, 2, 7 and 9, it will be noted that the beacon comprises a base member 1 having the upstanding framework supported thereon comprising vertical pipe sections 2, which are braced laterally by means of the pipe sections 3, secured to the brackets 4 in any suitable manner which in turn are secured by means of bolts 5 or other suitable means to the pipe sections 2 as best illustrated in Fig. 7. As shown best in Figs. 1 and 9 there are sections of pipe 3 located near the base of the frame structure as well as at the top thereof. So much of the frame structure which has been described forms in the present embodiment an octagonal figure in cross-section which is braced laterally by means of the pipe sections 6 connected to each other at 7 in the form of a cross and to alternate uprights 2 of the octagonal frame.

As is best illustrated in Fig. 9, the pipe section 7 forms a support for a plate 10, which may be secured thereto in any suitable manner as by the brackets 11 which are U-shaped brackets surrounding the pipe sections and fastened by suitable fastening means to the underside of the plate 10. The upper side of the plate 10 is provided with brackets 12 and the lower side thereof is provided with brackets 13, these brackets being held in place by bolts 14' which pass through both of the brackets and through the plate 10.

Figure 11:
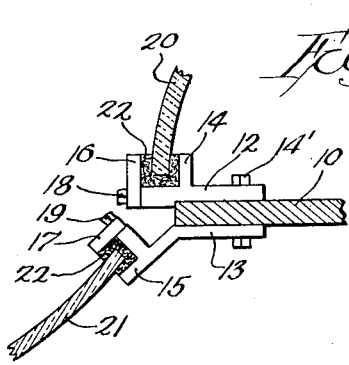
Fig. 11 is an enlarged detailed view of parts shown in Fig. 9.

As is best illustrated in Fig. 11, the brackets 12 and 13 are provided with projections 14 and 15 respectively, and plates 16 and 17 respectively, the latter being secured to the brackets by means of the screws 18 and 19. Projection 14 and plate 16 and also projection 15 and plate 17 form recesses in the brackets 12 and 13 respectively for the semi-spherical reflector 20 and cylindrical reflector 21 which will be described more fully later. In the recesses in the brackets 12 and 13, I arrange asbestos packing 22, and this asbestos packing is for the purpose of firmly holding the reflectors when the bolts 18 and 19 are rotated to advance the plates 16 and 17 towards the projections 14 and 15. The reflector 20 is preferably supported by four brackets 12, but the number of these brackets is immaterial and may be varied to suit various requirements.

There are eight cylindrical reflectors 21 and these cylindrical reflectors are each supported at their outer ends by means of the brackets 23 constructed in a manner similar to the brackets 12 and 13 except that the supporting parts of the brackets which are fastened to the frame are curved so as to conform to the shape of the pipe section 3. It will be noted that there are two brackets for supporting the outer ends of each of the cylindrical reflectors 21. This is for the purpose of preventing twisting of the reflectors.

Each of the upright pipe sections of the frame work carries a plurality of brackets for supporting a series of cylindrical reflectors 24 arranged about the octagonal frame. The construction of these brackets is best illustrated in Figs. 7 and 8 and comprises a stem portion 25 and angularly offset portion 26, the latter being secured to the pipe section 2 by means of the bolts or machine screws 27. The outer end of the stem portion is made in the form of a T-section having the branches 28. A plate 29 is secured to an extended portion 30 of the stem by means of machine screws 31 or like fastening means. The edges of the reflectors 24 are arranged between the branches 28 and the plate 29, a layer of asbestos 32 being arranged around the edges of the reflector so as to resiliently hold the reflector in proper position. Each bracket engages an edge of two adjacent reflectors, except the brackets at the top and bottom indicated by the reference numeral 33, these latter reflectors having only provision for the reception of one edge of a reflector similar to the brackets 12 and 13.

It will be noted from an inspection of Figs. 2 and 9 that the reflectors are arranged so as to present eight cylindrical reflecting surfaces arranged symmetrically with respect to the vertical axis of the frame. As is best illustrated in Figs. 3 and 4, the light rays which are received from the sun are reflected in a number of different directions by the reflectors which are struck by the rays of the sun. The result is that the beacon is visible from a great number of directions and yet the rays of the sun are minimized to a certain degree so as not to have a blinding effect on the aviator. Even on days when there is very little sun, it has been found that the mirrors reflect a great amount of light and make the beacon clearly visible from quite a distance. This is particularly true in the early morning and late afternoon hours. In some forms of my invention I contemplate increasing the size of the reflectors 21 to thereby increase the amount of light which is reflected. This I accomplish by increasing the size of the reflectors 21 and making them in the form shown in Fig. 10 at 34. The reflectors 34 are arranged to substantially cover the entire upper portion of the frame work, and of course, will reflect a greater amount of light than those illustrated in Fig. 9.

It is also desired to illuminate this beacon at night and to project rays therefrom in a fan shape to guide aviators in their flight. In order to do this, I provide the pipe sections 3 with brackets 35 which extend outwardly in a radial direction from the axis of the frame, these brackets extending outwardly substantially centrally with respect to the cylindrical reflectors. Between adjacent brackets, I arrange the vacuum tubes 36 which are supported in the metal end pieces 37 which abut against and are secured to the bracket 35. The vacuum tubes are filled with neon gas, and the tubes are adapted to be electrically connected to any source of electricity in any of the well known manners, the tubes illustrated being standard tubes and their connections to the electrical circuit being well known, and it is thought that for the purposes of this invention, it is unnecessary to show such electrical connections as the same are well known and form no part of the present invention.

As is best illustrated in Fig. 5, the tubes are placed in such a manner with respect to the reflectors that the light rays are reflected therefrom in a substantially narrow beam thereby causing the rays of light emitted by the neon tubes to be intensified. The rays of light are also projected upwardly so that the narrow beam is visible very distinctly from above the beacon. In fact, when an aeroplane is flying above the beacon, the rays of light show up in fan shape, there being eight beams of light or one beam for each set of reflectors.

The advantage of using a stationary beam is that the aviator, after picking up the beam, may fly down the beam and thereby establish a straight course. With a revolving beam this is not possible as the beam in a great many instances, or in fact most instances is lost to the aviator for a portion of its revolution. Furthermore, it acts more or less as a compass to guide the aviator in his flying and he can follow the beams as well as a compass when flying above the beams which appear as a fan when viewed from above. When an aviator is flying at approximately the height of the beams, he must pass through one of the beams if he is flying transversely thereto, and as soon as his plane is illuminated by the beam, he can turn his plane and fly down the beam with no difficulty whatsoever as the beam is stationary. This is not possible with the revolving beacon. A further advantage of the beacon which I use is that it penetrates mist and fog much more readily than does a white light. Therefore, on nights which are not clear, the beacon is more readily picked up than a white beacon such as is commonly used.

One of the greatest advantages of my beacon is that the cost is relatively small as compared with the cost of the usual search light beacon commonly used. Furthermore, the parts thereof may be dismantled and transported very readily in view of the fact that the entire beacon is made up in sections which may be assembled very quickly by any ordinary mechanic, and therefore it is not necessary to provide expensive machinery for hoisting the beacon and putting the same in place, and it is not necessary to have expert mechanics to install the same. Furthermore, if parts thereof become broken, additional parts may be substituted therefor very quickly.

Figs. 5 and 6 illustrate the manner in which the red rays from the beacon are sent out by the cylindrical mirrors or reflectors. It will be noticed that the tubes are not located at the center of curvature of the reflector as otherwise the rays of light would not be reflected properly. Preferably the tubes are arranged between the centers of curvature of the various reflectors and the reflectors themselves.

While I have illustrated my device as being mounted on a stationary base, it will be understood, of course, that if desired the base may be made rotatable thereby intensifying the sun flashes in the daytime and rotating the red beams at night, the source of light remaining fixed while the visibility of the red beams are seen in a greater circumferential area.

Obviously those skilled in the art to which this invention pertains may make other changes and modifications of this invention without departing from the spirit of this invention or the scope of the appended claim.

Having thus fully described an embodiment of my invention, what I desire to secure by Letters Patent of the United States is:

A sun flash beacon comprising a plurality of cylindrical reflectors arranged about a vertical axis, said reflectors having their axes substantially parallel to the first mentioned axis and facing outward, a plurality of cylindrical reflectors having their axes arranged perpendicularly to said first mentioned axis and the axes of said first mentioned cylindrical reflectors and facing upwardly, and a spherical reflector arranged symmetrically with respect to said first mentioned axis and having its reflecting surface extending upwardly.

ANDREW N. REBORI.